United States Patent [19]
Takenouchi et al.

[11] Patent Number: 5,193,014
[45] Date of Patent: Mar. 9, 1993

[54] METAL VESSEL HAVING HOLOGRAM OF DIFFRACTION GRATING FORMED THEREON

[75] Inventors: Ken Takenouchi; Kazuyuki Kurosawa, both of Yokohama; Makoto Horiguchi, Fujisawa; Tsuneo Imatani; Hideo Kurashima, both of Yokosuka, all of Japan

[73] Assignee: Toyo Seikan Kaisha Ltd., Tokyo, Japan

[21] Appl. No.: 721,581

[22] PCT Filed: Nov. 28, 1990

[86] PCT No.: PCT/JP90/01548
§ 371 Date: Aug. 29, 1991
§ 102(e) Date: Aug. 29, 1991

[87] PCT Pub. No.: WO91/08525
PCT Pub. Date: Jun. 13, 1991

[30] Foreign Application Priority Data

Nov. 28, 1989 [JP] Japan .................................. 1-306670
Dec. 28, 1989 [JP] Japan .................................. 1-338639

[51] Int. Cl.⁵ .............................................. G03H 1/04
[52] U.S. Cl. ................................................ 359/3; 359/1
[58] Field of Search ............................ 359/1, 3, 12, 52

[56] References Cited

U.S. PATENT DOCUMENTS 4,725,111  2/1988  Weitzen et al. .................... 359/12

Primary Examiner—Bruce Y. Arnold
Assistant Examiner—J. P. Ryan
Attorney, Agent, or Firm—Sughrue, Mion, Zinn, Macpeak & Seas

[57] ABSTRACT

The metal vessel of the present invention is characterized in that a relief type hologram or relief type diffraction grating is formed on at least a part of the vessel by coining. By forming this hologram or diffraction grating by coining, the dimensional precision or reproducibility of the hologram of diffraction grating is highly improved. The metal vessel having the hologram formed thereon is excellent in the design and decorative characteristics, and in the metal vessel having the diffraction grating formed thereon, changes of the inner pressure can be easily detected by utilizing this diffraction grating.

11 Claims, 6 Drawing Sheets

Fig. 1-A

PHOTOGRAPHING STEP A

FIG. 1B
STEP B

FIG. 1C
STEP C

FIG. 1D
STEP D

METAL VESSEL HAVING HOLOGRAM OF DIFFRACTION GRATING FORMED THEREON

DESCRIPTION

1. Technical Background

The present invention relates to a metal vessel having a relief type hologram or relief type diffraction grating formed on the surface, and also to a process for the production thereof.

2. Conventional Technique

The hologram is characterized in that a three-dimensional image can be easily reproduced and an iridescent decorative effect can be manifested. Accordingly, the hologram is utilized in the field of display for gifts, novelties and children's toys or in the field of publishing and printing for books, magazine front pages and cut-in illustrations.

Furthermore, multiplex recording or high-density recording is made possible by the hologram, and the hologram is used as a light memory. Since a precision machine is necessary for the formation of a hologram and forgery is difficult, the hologram is utilized for securities, credit cards and ID cards.

The formation of a hologram on a packaging material or a vessel has already been proposed. For example, Japanese Unexamined Utility Model Publication No. 62-143663 discloses a vessel comprising a packaging material having a hologram formed on a part or all of the surface of a substrate, and Japanese Unexamined Utility Model Publication No. 63-70934 discloses a transparent cylindrical vessel having a multiplex hologram formed on the inner side or outer side of a vessel lid.

As the means for reproducing the hologram, there is known a process in which a photosensitive material is used and a hologram is directly formed by light exposure and interference, and a process in which a smooth plastic material is embossed to form a surface relief type hologram.

For forming a hologram on a vessel, it is considered that there can be adopted a method in which a hologram is directly formed on the side face of the vessel, and a method in which a hologram is formed on a seal or label and this seal or label is bonded to the side face of the vessel. These methods, however, have the following defects.

Namely, according to procedures adopted at the present, a convex-concave hologram formed on the surface of a tool is transcribed in the melted state in the form of a relief on the surface of plastics. In the plastics, the difference between the density in the melted state and the density at room temperature is large and the shrinkage tendency is conspicuous, and the dimensional precision is low and the reproducibility of a fine pattern is poor. Furthermore, the hologram is readily deformed by the internal strain generated at the molding. For directly forming a hologram on the side face of a vessel, a concave-convex face for forming a hologram is formed on a mold face in advance. Even though the vessel wall being swollen by blow forming, air-pressure forming or the like is in the melted state, in case of a hollow-formed vessel which is immediately cooled and solidified on the contact with the surface of the mold, it is very difficult to faithfully form a relief type hologram. On the other hand, the method in which a seal or label is bonded is defective in that the troublesome bonding operation should be carried out in addition to the vessel-forming operation, and the hologram is not integrated with the vessel.

SUMMARY OF THE INVENTION

It was surprisingly found that if a substantially flat plate having a concave-convex hologram formed thereon and a metal blank having a smooth surface are subjected to coining in the direction orthogonal to the surface, a relief type hologram can be transferred on the surface of the metal blank, and the formed hologram is prominently excellent in the dimensional precision and reproducibility of a concave-convex pattern and the strength and durability of the hologram.

It also was found that if a flat plate having a diffraction grating formed thereon is subjected to coining in the same manner as described above, a relief type diffraction grating can be formed on the surface of a metal blank, and in a metal vessel prepared by using a metal blank having a relief type diffraction grating thus formed, the change of the inner pressure of the vessel can be effectively detected.

It is therefore a primary object of the present invention to provide a metal vessel having a relief type hologram formed on the surface thereof, in which the dimensional precision and reproducibility of a concave-convex pattern of the hologram are excellent, and a process for the preparation of this metal vessel.

Another object of the present invention is to provide a metal vessel having a relief type diffraction grating formed on the surface thereof, in which the change of the inner pressure of the vessel can be effectively detected, and a process for the preparation of this metal vessel.

In accordance with one aspect of the present invention, there is provided a metal vessel having a relief type hologram or relief type diffraction grating formed by coining on at least a part of the surface of the metal vessel.

In accordance with another aspect of the present invention, there is provided a process for the preparation of a metal vessel, which comprises subjecting a substantially flat plate having a concave-convex hologram or diffraction grating formed thereon and a metal blank having a smooth surface to coining in a direction orthogonal to the surface to transfer a relief type hologram or relief type diffraction grating on the surface of the metal blank by plastic deformation of the metal blank.

DETAILED DESCRIPTION OF THE INVENTION

Coining (pressure printing) referred to in the present invention is a working process in which a metal blank is pressed by a plate (mold) having concavities and convexities formed on the surface to form a pattern on the surface of the metal blank. It was not known before the present invention that a fine concave-convex hologram or diffraction grating can be formed by this coining.

In the flat plate used in the present invention, a hologram or diffraction grating is formed in a concave-convex form. This concave-convex form means that interference fringes corresponding to wave faces of rays of an original to be reproduced as an image are in the form of concavities and convexities. In many cases, the pitch of the concavities and convexities are very fine and in the range of 0.1 to 5 μm. It is quite a surprising knowledge that this fine concave-convex pattern can be transferred onto the surface of a metal blank by the above-mentioned coining.

It is important that the metal blank used in the present invention should be flat and the surface should be as smooth as possible. More specifically, if the center line average height of the surface of the metal blank is smaller than 0.5 μm, especially smaller than 0.3 μm, satisfactory results can be obtained as regards the dimensional precision and reproducibility of the hologram.

The center line average height (JIS B0601) in the metal surface is determined as follows. Namely, a portion having a measured length l is taken out from the roughness curve in the direction of the center line, and the roughness curve is expressed as y=f(X) while taking the center line of the taken-out portion as the axis X and the direction of the longitudinal magnification as the axis Y. The value determined from the following formula at this time is expressed as the center line average height in the micrometer (um) unit;

$$Ra = \frac{1}{l} \int_0^l |f(X)| dX$$

Namely, the center line average height concerns the degree of concavities and convexities (degree of the amplitude) in the vertical direction on the metal surface, and the reproducibility of the hologram depends on how precisely the pitch of concavities and convexities is reproduced in the plane direction. Nevertheless, in the present invention, if Ra exceeds 0.5 μm, there is produced a portion where a concave-convex pattern is not transferred and the signal/noise ratio (s/n ratio) of the reproducibility becomes small, and the reproduced image tends to be buried in the noise, but if Ra is controlled below 0.5 μm, the signal/noise ratio can be increased to a range giving no practical disadvantage.

When a plate composed of a steel material is subjected to stamping, the contact pressure is highest in the peripheral portion and is reduced toward the central portion. Accordingly, also in the metal blank contacted with the plate, plastic deformation is large in a portion corresponding to this peripheral portion and plastic deformation is small in a portion corresponding to the central portion. Accordingly, in the worked metal blanks, the degree of concavities and convexities is large in the peripheral portion, and it is found that a hologram where the degree of concavities and convexities is lower in the central portion and this degree is not uniform is formed.

If a plate having a gentle curved face convex toward the surface is used as the substantially flat plate according to one preferred embodiment of the present invention, the contact pressure between the plate and the metal becomes uniform in the peripheral portion and the central portion, and it is possible to form a hologram even and uniform in any portion on the surface of the metal blank.

According to another preferred embodiment of the present invention, the plate is made as thin as possible to render the plate deformable and the coining operation is carried out through a cushioning material layer, whereby the contact pressure becomes uniform throughout the contact surface, and the concave-convex pattern of the plate is uniformly and faithfully transferred and reproduced on the metal blank.

Although the surface of the metal blank is smooth, in many cases, undulations, peaks and troughs that cannot be neglected are present on the surface of the metal blank. If a plate having the latter structure is used, these non-smooth factors are absorbed and moderated by the plate, and irrespectively of the presence of these non-smooth factors, a uniform and even relief type hologram or relief type diffraction grating can be transferred.

Figure 1:
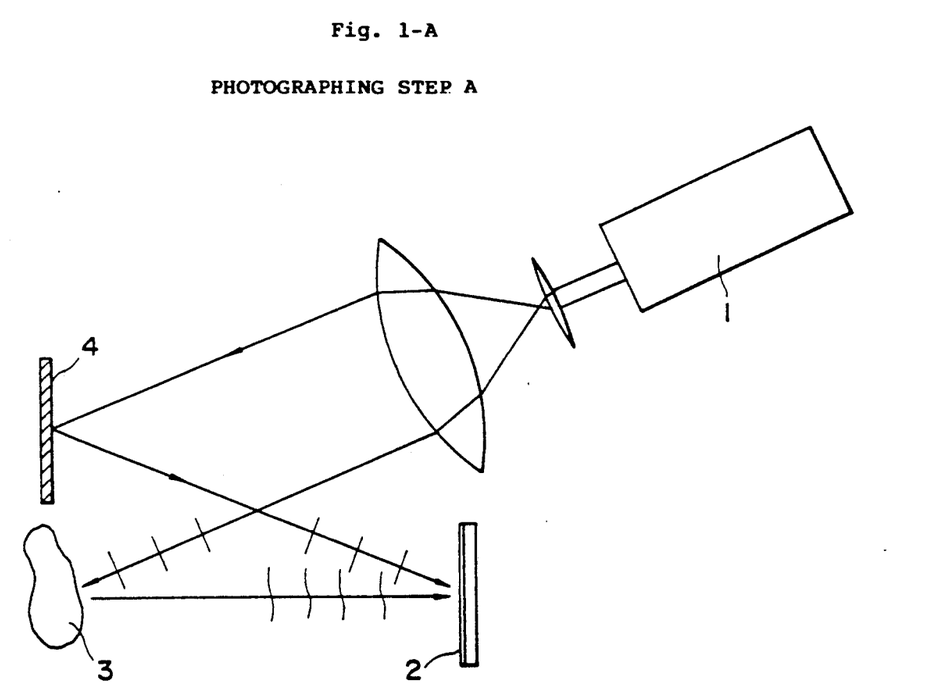
FIG. 1 is a diagram illustrating the photographing step A, the developing step B, the metal plate mold-forming step C and the transfer step D for transferring a relief type hologram on a metal blank in the production of the relief type hologram of the present invention.
Figure 1B:
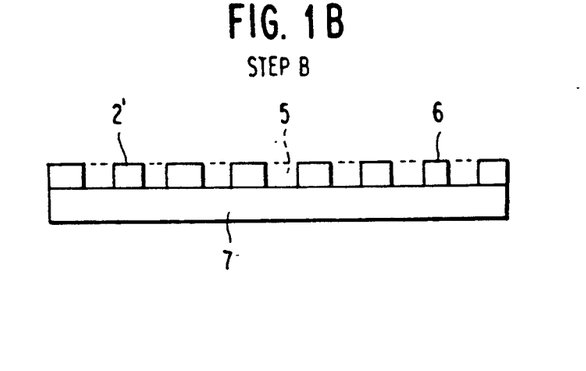
Figure 1C:
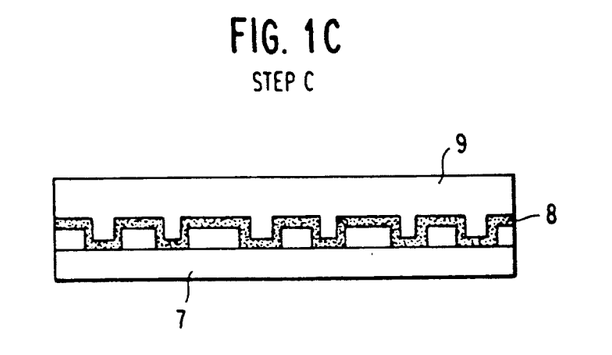
Figure 1D:
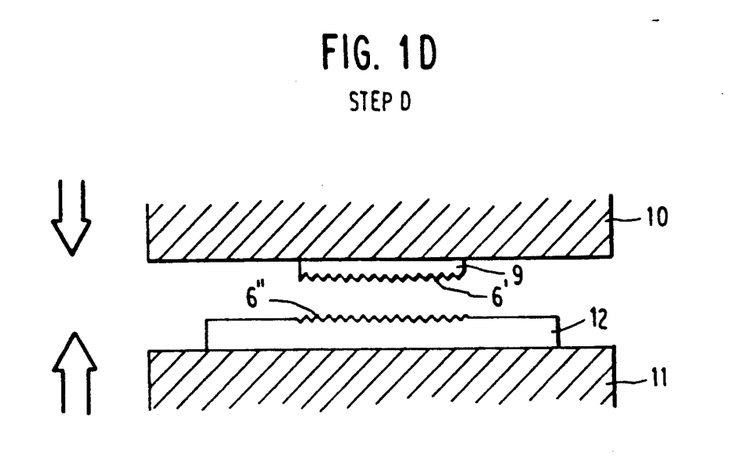

Referring to FIG. 1 illustrating the process of the present invention, at the photographing step A, a laser beam source 1, a photoresist photosensitive layer 2, an original 3 and a relationship that a reflected light from the original 3 and reference reflected light from the reflecting mirror 4 are simultaneously incident on the photoresist layer 2. Thus, interference fringes corresponding to the wave faces of the light from the original to be expressed as an image are formed on the photoresist layer 2. The photoresist layer 2 can be either of the negative type where the light-exposed portion is cured or of the positive type where the light-exposed portion is dissolved.

At the developing step B, the exposed photoresist layer 2' is subjected to a known developing treatment. By this developing treatment, the uncured non-exposed portion or soluble exposed portion 5 is dissolved to form a photoresist plate 7 having a concave-convex pattern 6 on the surface is formed.

A known method can be adopted for forming a hologram on the photoresist layer. For example, an original to be expressed as an image (hereinafter referred to as "origina") is irradiated with laser beams (for example, Ar+ laser, 488 nm, output of 5 mW), and the obtained reflected light from the original and the reference light divided from the same light source are simultaneously incident on a dry plate coated with a photoresist, whereby interference fringes corresponding to wave faces of the light from the original are recorded on the dry plate. Thus, photographing of the original is carried out for 2 to 60 minutes, and then, the development is effected to obtain a concave-convex pattern of interference fringes.

Since the sensitivity of the photoresist is generally low, there can also be adopted a method in which photographing is once carried out by using a silver salt photosensitive material to obtain a starting hologram, the starting hologram is brought close to a photoresist, the photoresist is exposed to light through the starting hologram on the photoresist, and the photoresist is subjected to a developing treatment.

Known photoresist materials utilizing light liberation reaction, light decomposition reaction, light redox reaction, light polymerization reaction or light crosslinking reaction can be used for the photoresist layer 2. For example, there can be used a diazo resin, a cyclic polyisoprene resin, a phenolic resin and a novolak resin.

At the metal plate mold-preparing step C, a thin metal layer 8 is formed on the surface of a photoresist plate 7 by such means as vacuum deposition or electroless plating, and the layer 8 is subjected to an electrocasting operation to form a metal plate mold 9 composed of a hard metal such as nickel or chromium. The photoresist layer 7 is mechanically peeled from the metal plate mold, or only the metal plate mold 9 is recovered by chemical dissolution or the like.

At the step D of transfer to the metal blank, a metal plate mold 9 having a concave-convex pattern 6' is attached to an upper pressing member 10, and a metal blank 12 is supported on a lower pressing member 11. The plate 9 and metal blank 12 are coined in the direction orthogonal to the surfaces thereof (the direction indicated by the arrow) to form a relief type hologram 6'' on the surface of the metal blank 12.

Figure 2:
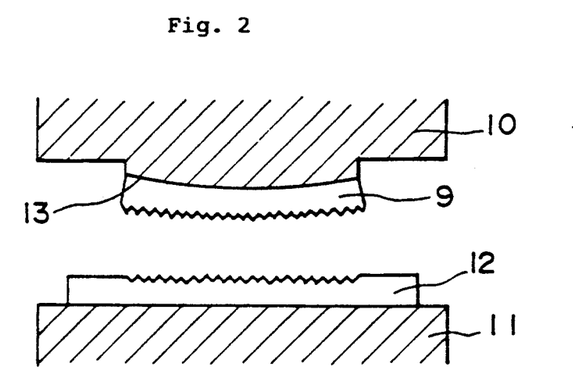
FIG. 2 is a diagram illustrating another preferred embodiment of the transfer step D.

Referring to FIG. 2 showing a preferred embodiment of the transfer step D, a gently curved surface (the degree of convexities is emphasized in the drawings) is formed on a supporting surface 13 of the upper pressing member 10 supporting the plate 9 so that the contact pressure is uniform in any portion. The shape of the curved surface can be any optional surface of a curve of second degree, for example, aspherical surface, an elliptical rotatory surface, a parabolic rotatory surface or a hyperbolic rotatory surface, though the shape of the curved surface is not particularly critical. The ratio (P/D) of the diameter (D) of the curved surface to the protrusion height (P) is preferably in the range of from $1.0 \times 10^{-5}$ to $5.0 \times 10^{-2}$, especially preferably from $5.0 \times 10^{-5}$ to $5.0 \times 10^{-2}$.

Figure 3:
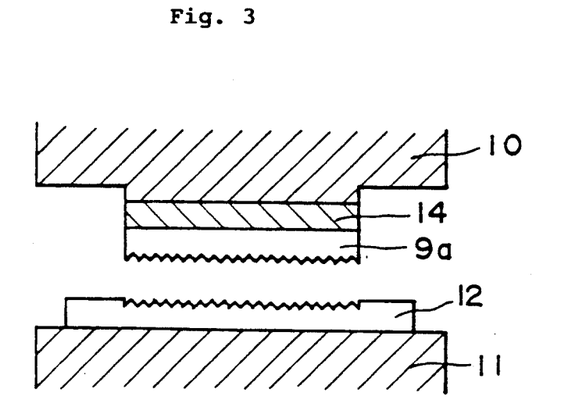
FIG. 3 and 4 are diagrams illustrating still another preferred embodiments of the transfer step D.
Figure 4:
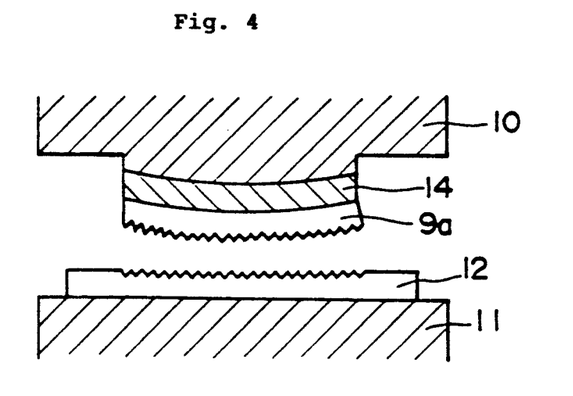
Figure 5:
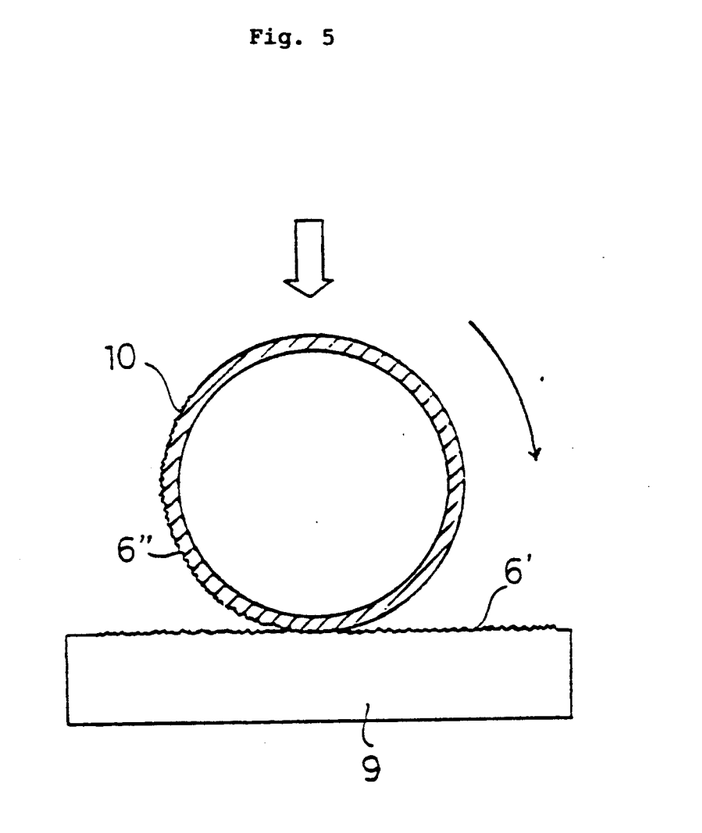
FIG. 5 is a diagram illustrating still another preferred embodiment of the transfer step D.

According to a most preferred embodiment of the present invention, as shown in FIGS. 3 and 4, a deformable thin metal plate mold 9a is supported on the upper pressing member 10 shown in FIGS. 1 and 2 through a cushioning layer 14.

For example, the surface of the starting photoresist plate is rendered electroconductive by forming a gold film by vacuum deposition or a silver film by electroless plating, and by using this film as an electrode, a metal plating layer such as a nickel plating layer or a chromium plating layer is formed on the surface of the starting photoresist plate by ordinary electric plating. It is preferred that the thickness of the plate be 25 to 200 μm, especially 30 to 100 μm.

An optional material having a high elastic limit and a large restoring force, which has a compressive modulus of $1 \times 10^6$ to $1 \times 10^{10}$ Pa, especially $1 \times 10^6$ to $1 \times 10^9$ Pa, is used as a cushioning material. For example, various plastics such as polypropylene, polyesters, polyamides and polyvinyl chloride, and natural and synthetic various rubbers can be used. The thickness of the cushioning layer is preferably 10 to 200 μm, especially preferably 30 to 100 μm.

For the surface of the metal on which the hologram is to be transferred, it is sufficient if Ra is within the above-mentioned range. In order to transfer a concave-concave pattern with a good reproducibility and attain a long life of the metal plate mold, it is necessary that the hardness of the metal surface for the transfer should be lower than the surface hardness of the metal plate mold. A metal material having a vickers hardness lower than 300, especially lower than 200, is preferably used. For example, not only a metal blank composed of pure aluminum or an aluminum alloy alone, but also a steel plate having a soft metal deposited on the surface, for example, a tin plate sheet, an aluminum-deposited steel plate or a tin/nickel-deposited steel plate, can be used.

In addition to the above-mentioned metal plates, combined materials comprising a metal plate and other material, for example, metal laminates with various plastics, can be used as the metal blank, so far as the surface is composed of a metal.

The pressure used for coining is such that the pattern of the plate is transferred as a relief type hologram on the surface of the metal blank. This pressure is preferably 5 to 50 kgf/mm$^2$ and especially preferably 10 to 30 kgf/mm$^2$. Room temperature is sufficient for coining, but heating or cooling can be performed according to need.

In the present invention, even if the metal blank having a relief type hologram formed in the above-mentioned manner on the surface is subjected, for example, to drawing, the hologram is not lost, and therefore, if this metal blank is subjected to a known working operation, a metal vessel such as a draw-formed can, a draw-iron-formed can, a tinplate welded can, a soldered can or a bonded can is prepared. The portion to which the hologram is transferred is not particularly critical. Namely, the hologram can be transferred to a can barrel, a can bottom, a can proper or a vessel lid.

In case of a side-seam can, the transfer of the hologram is carried out in the state of a flat plate before formation of a seam, or after formation of a seam and before or after wrap-seaming of a lid. In case of a draw-formed can or draw-iron-formed can, the transfer of the hologram is carried out in the state of a flat plate before the forming operation or in the state of a cup after the forming operation. In case of a vessel lid, the transfer of the hologram is carried out in the state of a flat plate before the formation of a lid or in the state of a lid after the formation of the lid.

In the present invention, after the hologram is transferred to the metal surface, a transparent resin protecting layer can be formed on the surface. Resins that can be used as a paint are not particularly critical, and for example, thermosetting resin paints such as a phenol-formaldehyde resin, a furan-formaldehyde resin, a xylene-formaldehyde resin, a ketone-formaldehyde resin, a urea-formaldehyde resin, a melamine-formaldehyde resin, an alkyd resin, a unsaturated polyester resin, an epoxy resin, a bismaleimide resin, a triallyl cyanate resin, a thermosetting acrylic resin, a silicone resin and an oleoresin, and thermoplastic resin paints such as a vinyl chloride-vinyl acetate copolymer, a partially saponified vinyl chloride-vinyl acetate copolymer, a vinyl chloride-maleic acid copolymer, a vinyl chloride-maleic acid-vinyl acetate copolymer, an acrylic polymer and a saturated polyester resin can be mentioned. These resin paints can be used singly or in the form of mixture of two or more of these resins.

It is preferred that the thickness of the formed protecting layer be 1 to 15 μm, especially 3 to 10 μm. If the thickness is too large, it is apprehended that the hologram cannot be clearly seen, and if the thickness is too small, the function of the protecting layer cannot be exerted. Known methods such as a spray coating method and a roll coating method can be adopted for the coating operation. Preferably, the coating film is baked at a temperature of 160° to 210° C. for 5 to 15 minutes.

According to the above-mentioned process, by coining a flat plate having a concave-convex hologram formed thereon and a flat metal blank having a smooth surface in the direction orthogonal to the surface, a relief type hologram having a high dimensional precision of the concave-convex pattern, an excellent pattern reproducibility and a high strength or durability of the pattern can be formed on the metal surface with a high productivity very easily.

When a plate having a gentle curved face convex toward the surface or a combination of a thin plate with a cushioning material is used, the contact pressure between the plate and the metal blank is uniform i any portion, and an even and uniform hologram can be formed on the surface of the metal blank. In the latter case, even if there is present a non-smooth factor, this is absorbed and moderated and a uniform relief type hologram can be formed.

Furthermore, the hologram formed on the surface of the metal vessel in the above-mentioned manner can be used for detecting the change of the inner pressure of the vessel by utilizing a deformation of the image by strain of the vessel shape.

According to the present invention, in the above-mentioned preparation process, by using a metal plate mold having a diffraction grating of a concave-convex pattern instead of the metal plate mold 9 having a hologram of a concave-convex pattern, a metal vessel having a relief type diffraction grating formed on the surface thereof can be obtained. The relief type diffraction grating formed on the vessel surface has a function of displaying the inner pressure of the vessel.

The method for detecting a minute strain of a sample grating by using laser beams is known as the Moire interference method (see, for example, "Measurement of Minute Strain by Moire Interference Method Using Laser", Lecture No. 87-033, Collection of Lectures, Japanese Machine Association, V. 53, No. 496).

According to this method, a diffraction grating having a pitch d is bonded to the surface of a sample, laser beams having a wavelength $\lambda$ are incident on the grating face at an incident angle $\alpha$, $-\alpha$, and the incident angle $\alpha$ is selected so that the following requirement is satisfied:

$$\sin \alpha = n\lambda/d \text{ (in which } n \text{ is the degree of diffraction)}.$$

At this time, both of diffracted lights of the incident light have wave faces parallel to the face of the diffraction grating. When this diffraction grating is strained, a slight difference is brought about between the two diffracted lights to generate an interference fringe. Accordingly, deformation of the sample can be detected by observing this interference fringe.

In the above-mentioned metal vessel having the relief type diffraction grating, when the inner pressure of the vessel is a standard value relatively to the pitch d of the diffraction grating, the incident angle $\alpha$ and wavelength $\lambda$ of the laser beam are selected so that the requirement of the above-mentioned formula is satisfied. Thus, the deviation of the standard inner pressure can be detected by optically detecting the strain of the diffraction grating caused by the deviation of the standard inner pressure.

Figure 6:
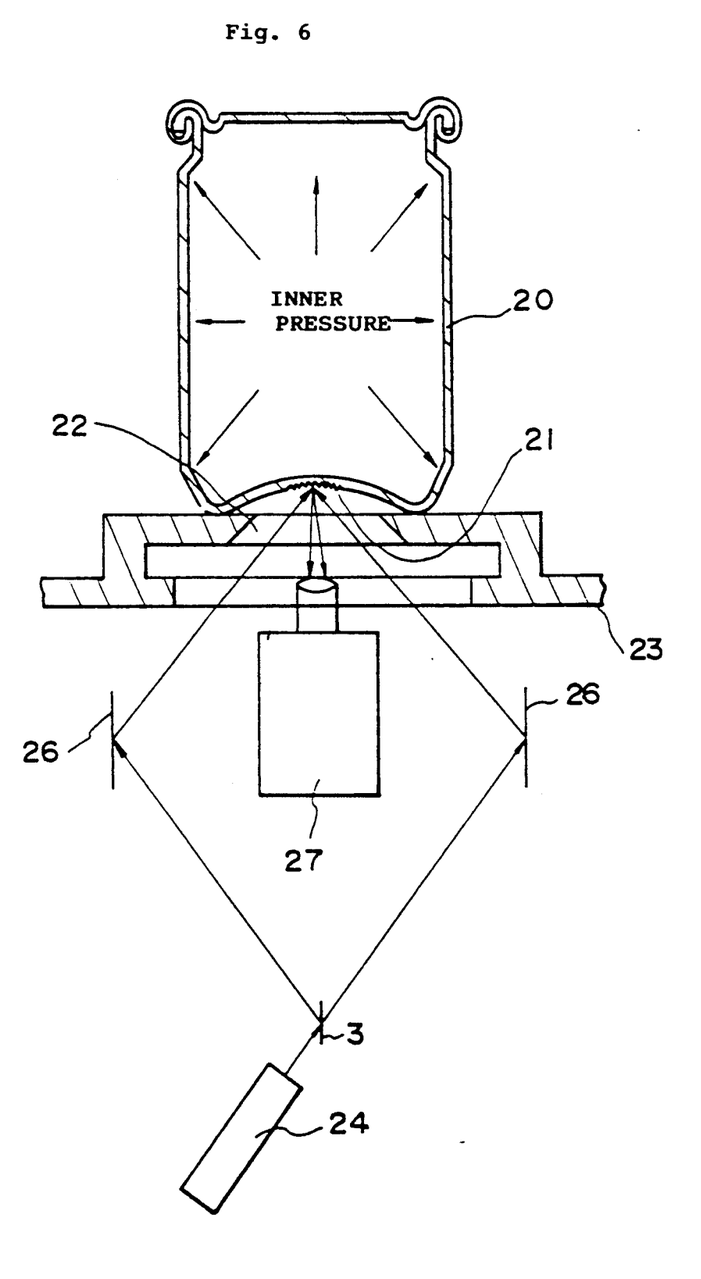
FIG. 6 is a diagram illustrating an example of the apparatus for detecting the change of the inner pressure of the vessel by using a metal vessel having a diffraction grating formed thereon.

Referring to FIG. 6 illustrating an apparatus for preferably carrying out inspection of the inner pressure of the vessel, reference numeral 20 represents a vessel, the change of the inner pressure of which is to be detected. A diffraction grating 21 formed according to the above-mentioned method is arranged on the bottom of the vessel 20. In this embodiment, the vessel 20 is a two-piece can. The diffraction grating 21 can be formed on a can barrel. However, in this case, since registration is necessary at the detection, it is generally preferred that the diffraction grating be formed on a can bottom or a vessel lid.

In the apparatus shown in FIG. 6, the vessel 20 is placed on a stand 23 having a detection hole 22. Below the stand 23, there are disposed an optical system comprising a laser beam source 24, a beam splitter 25 and mirrors 26 and 26', and a light-detecting element 27. The laser beam from the laser beam source 24 is split by the beam splitter 25 and the split beams are incident on the diffraction grating 21 formed on the bottom of the vessel through the detection hole 22 at the same angle from directions opposite to each other by the mirrors 26 and 26'. The light diffracted from the diffraction grating 21 is incident on the light-detecting element 27.

For example, when Hr-Ne gas laser having a wavelength of 6328 Å is used as the light source, a diffraction grating of 900 lines/mm is formed and the diffraction angle is set at 34.7°, the change of one of interference fringes included in the visual field of the light-detecting element corresponds to an inner pressure of about 1 mmHg. The in-plane strain quantity of the grating by such a change of the inner pressure is $10^{-3}$ to $10^{-5}$, and the change of the diffraction angle is proportional to this in-plane strain quantity. According to the conventional beating detection method or the like a change of the inner pressure in the vessel cannot be detected unless the pressure change exceeds about 10 mmHg. In contrast, according to the above-mentioned process of the present invention, such a small change of the inner pressure as 1 mmHg can be detected.

For this detection, the light should be incident from the direction orthogonal to the direction of the grating line of the diffraction grating, and for producing symmetric incident lights, mirrors 26 and 26' should be symmetrically arranged in the plane vertical to the grating line. However, detection becomes possible irrespectively of the grating direction by rotating the stand 23 or the optical system or by arranging the optical system rotationally symmetrically.

Figure 7:
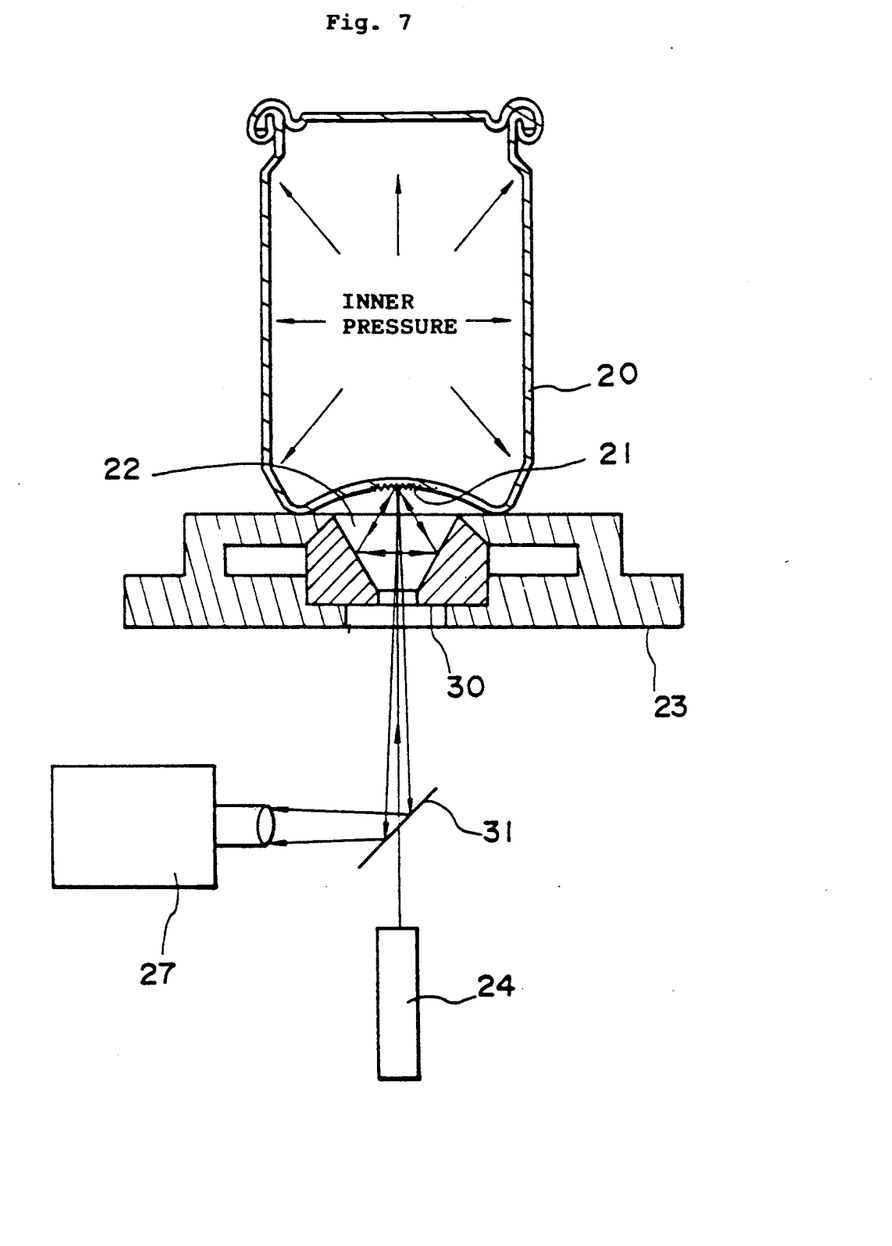
FIG. 7 is a diagram illustrating another example of the apparatus as shown in FIG. 6.

In the detection optical system shown in FIG. 7, the laser light from the laser light source 24 is vertically incident on the diffraction grating 21 formed on the bottom face of the can 20. Two diffracted lights having the same degree and different signs, for example, +1 primary diffracted lights, are twice reflected by a conical mirror 30 and are advanced in clockwise and counterclockwise optical paths and are incident on the same position as the first incident position to form symmetric incident lights. The deflected lights to these incident lights are reflected by the mirror 31 and detected by the light-detecting element 27. The optical arrangement of this detection optical system is established irrespectively of the direction of the diffracted grating lines, and therefore, the detection can be performed irrespectively of the direction of the diffraction grating.

As is apparent from the foregoing description, if the diffraction grating is formed on a part of the metal vessel, especially a bottom thereof, the change of the inner pressure of the vessel can be simply detected at any time and at any place. Furthermore, since only the deviation from the reference value is detected, the reference value may be a positive pressure or a negative pressure, and if one detecting apparatus is placed at a counter of a retail shop or the like, there can be attained an excellent effect of inspecting changes of inner pressures in various vessels very simply.

Furthermore, during the period of from filling of the content in vessels to forwarding of the filled vessels, vessels having an inner pressure different from the standard value can be detected, and these vessels can be excluded by some means or other.

EXAMPLE 1

A nickelplate having a thickness of 50 μm, on which a hologram of a concave-convex pattern having a distribution pitch of 0.4 to 5 μm and a groove depth of 1 μm was formed, was attached to a support having a flat surface of a flatness of 0.1 μm and Rmax of 0.01 μm, which was composed of tool steel tempered to a Rockwell hardness of 60 and having a hard chromium plating on the surface, whereby a transfer upper mold having a circular sectional shape having a diameter of 20 mm was prepared. This upper mold and a lower mold having a flat surface of a flatness of 0.1 μm and Rmax of 0.01 μm, which was composed of tool steel tempered to a Rockwell hardness of 60 and having a hard chromium plating on the surface, were attached to a pressing apparatus. An aluminum alloy (JIS A3004P) plate having a thickness of 0.32 mm, a center line average height of 0.1 μm and a vickers hardness of 95 was placed between the upper and lower molds, and the assembly was pressed by a pressing force of 9 tons. The hologram was transferred in a good state over the entire region of the plate mold, as shown in Table 1. When the groove depth of the transferred hologram was measured by a tracer type roughness meter, it was found that the groove depth was gradually changed and was 1 μm at the peripheral part of the transfer zone and 0.2 μm at the central part.

A cup-shaped vessel was obtained by subjecting this aluminum alloy plate to draw/deep-draw forming according to customary procedures. A satisfactory image could be obtained from the hologram formed on the outer surface of this vessel.

EXAMPLE 2

A hologram was transferred in the same manner as described in Example 1 except that the surface of the upper mold support had a spherical shape of a radius of 2000 mm. The hologram was transferred in a good state over the entire region of the plate mold, as shown in Table 1. The groove depth of the transferred hologram was 1 μm and uniform throughout the transfer region.

A cup-shaped vessel was prepared in the same manner as described in Example 1. A satisfactory image could be obtained from the hologram formed on the outer surface of the vessel.

EXAMPLE 3

A hologram was transferred in the same manner as described in Example 1 except that the nickel plate having the hologram formed thereon was attached to the upper mold support through a rubber cushioning member of 50 μm thick. The hologram was transferred in a good state over the entire region of the mold plate, as shown in Table 1. The groove depth of the transferred hologram was 0.9 μm at the peripheral part of the transfer region and 0.6 μm at the central part.

A cup-shaped vessel was prepared in the same manner as described in Example 1. A satisfactory image could be obtained from the hologram on the outer surface of the vessel.

EXAMPLE 4

A hologram was transferred in the same manner as described in Example 2 except that the nickel plate having the hologram formed thereon was attached to the upper mold support through a rubber cushioning member of 50 μm thick. The hologram was transferred in a good state over the entire region of the plate mold, as shown in Table 1. The groove depth of the transferred hologram was 0.9 μm and uniform throughout the transfer region.

A cup-shaped vessel was prepared in the same manner as described in Example 1. A satisfactory image could be obtained from the hologram on the outer surface of the vessel.

EXAMPLE 5

A hologram was transferred in the same manner as described in Example 3 except that undulations having a cycle of about 1 mm, longer than the surface roughness measured cut-off value, and a height of about 2 μm were formed on the material to which the hologram was to be transferred. The hologram was transferred in a good state over the entire region of the plate mold, as shown in Table 1. The groove depth of the transferred hologram was 0.9 μm at the peripheral part of the transfer region and 0.6 μm at the central part.

Then, a transparent resin was applied as a protecting layer on the surface on which the disk-shaped hologram was formed, and a cup-shaped vessel was prepared in the same manner as described in Example 1. A satisfactory image could be obtained from the hologram formed on the outer surface of the vessel.

EXAMPLE 6

A hologram was transferred in the same manner as described in Example 1 except that a tin-deposited steel plate having a thickness of 0.24 mm, a tin deposition quantity of 2.8 g/m$^2$ (on one surface), a center line average height of 0.08 μm and a vickers hardness of 95 was used as the material to which the hologram was to be transferred. The hologram was transferred in a good state over the entire region of the plate mold, as shown in Table 1. The groove depth of the transferred hologram was 1 μm at the peripheral part and 0.2 μm at the central part.

Then, a transparent resin was applied as a protecting layer on the surface where the hologram of the plate was formed, and the hologram-transferred plate was formed into a cylindrical welded can barrel according to known procedures and both of the open ends were flanged. Lids composed of a tin-deposited steel plate were double-wrap-seamed to the flanged parts to form a can body.

A satisfactory image could be obtained from the hologram formed on the outer surface of the obtained can body.

Comparative Example 1

A hologram was transferred in the same manner as described in Example 1 except that the pressing force was changed to 1 ton. As shown in Table 1, the hologram was transferred at the peripheral part, with which the plate had been brought into contact, but at a central part having a diameter of 8 mm, the hologram was not transferred. The groove depth of the transferred hologram was 0.2 μm at largest.

Comparative Example 2

A hologram was transferred in the same manner as described in Example 1 except that the pressing force was changed to 20 tons. As shown in Table 1, a concavity corresponding to the shape of the plate mold was formed, but the hologram was not transferred. Furthermore, the material to which the hologram was to be transferred was warped by pressing, and the plate material was deteriorated.

Comparative Example 3

A hologram was transferred in the same manner as described in Example 1 except that the surface of the upper mold support had a spherical shape of a radius of 500 mm. As shown in Table 1, the hologram was transferred only to the region having a diameter of 16 mm. The material to which the hologram was to be transferred was warped by pressing, and the plate material was deteriorated.

Comparative Example 4

A hologram was transferred in the same manner as described in Example 2 except that the thickness of the nickel plate having the hologram formed thereon was changed to 20 μm. As shown in Table 1, the plate was broken by pressing and the hologram was not transferred.

Comparative Example 5

A hologram was transferred in the same manner as described in Example 2 except that the thickness of the nickel plate having the hologram forming thereon was changed to 250 μm. As shown in Table 1, the plate was broken by pressing, and the hologram was not transferred.

Comparative Example 6

A hologram was transferred in the same manner as described in Example 2 except that the nickel plate having the hologram formed thereon was attached to the upper mold support through a rubber cushioning member having a thickness of 300 μm. As shown in Table 1, the pressing force was absorbed by the deformation of the cushioning member, and the hologram was not transferred.

TABLE 1

Hologram Transfer Results

| | Pitch (μm) of Hologram | Groove Depth (μm) | Curvature (mm) of Upper Mold Support | Thickness (μm) of Nickel Plate | Thickness (μm) of Cushioning Member | Pressing Force (ton) | Material to which Hologram was to be Transferred | Transfer State | Transfer Depth (μm) |
|---|---|---|---|---|---|---|---|---|---|
| Example 1 | 0.4 to 5 | 1 | flat (SR00) | 50 | not used | 9 | aluminum plate (A3004P), thickness = 0.32 mm, HV = 95, Ra = 0.1 μm | transferred in good state over entire region of plate mold | 0.2 μm at central part, 1.0 μm at peripheral part |
| Example 2 | 0.4 to 5 | " | SR2000 | " | not used | " | aluminum plate (A3004P), thickness = 0.32 mm, Hv = 95, Ra = 0.1 μm | transferred in good state over entire region of plate mold | 1.0 μm uniformly |
| Example 3 | 0.4 to 5 | " | flat (SR00) | " | 50 | " | aluminum plate (A3004P), thickness = 0.32 mm, Hv = 95, Ra = 0.1 μm | transferred in good state over entire region of plate mold | 0.6 μm at central part, 0.9 μm at peripheral part |
| Example 4 | 0.4 to 5 | " | SR2000 | " | 50 | " | aluminum plate (A3004P), thickness = 0.32 mm, Hv = 95, Ra = 0.1 μm | transferred in good state over entire region of plate mold | 0.9 μm uniformly |
| Example 5 | 0.4 to 5 | " | flat (SR00) | " | 50 | " | aluminum plate (A3004P), thickness = 0.32 mm, Hv = 95, Ra = 0.1 μm (but with undulation of cycle of 1 mm and height of 2 μm) | transferred in good state over entire region of plate mold | 0.6 μm at central part, 0.9 μm at peripheral part |
| Example 6 | 0.4 to 5 | " | flat (SR00) | " | no used | " | tin-deposited steel plate, thickness = 0.24 mm, Hv = 95, Ra = 0.08 μm | transferred in good state over entire region of plate mold | 0.2 μm at central part, 1.0 μm at peripheral part |
| Comparative Example 1 | 0.4 to 5 | 1 | flat (SR00) | 50 | not used | 1 | aluminum plate (A3004P), thickness = 0.32 mm, Hv = 95, Ra = 0.1 μm | transferred only in annular region having an inner diameter of 8 mm and an outer diameter of 20 mm | 0.2 μm at largest |
| Comparative Example 2 | 0.4 to 5 | " | flat (SR00) | " | not used | 20 | aluminum plate (A3004P), thickness = 0.32 mm, Hv = 95, Ra = 0.1 μm | hologram not trasferred and plate material deformed | — |
| Comparative Example 3 | 0.4 to 5 | 1 | SR500 | " | not used | 9 | aluminum plate (A3004P), thickness = 0.32 mm, Hv = 95, Ra = 0.1 μm | hologram transferred only in region having a diameter of 16 mm from the center, and plate material deformed | 1.0 μm at central part, abruptly decreased toward peripheral part |
| Comparative Example 4 | 0.4 to 5 | " | SR2000 | 20 | not used | 9 | aluminum plate (A3004P), thickness = 0.32 mm, Hv = 95, Ra = 0.1 μm | plate broken and hologram not transformed | — |
| Comparative | 0.4 to | " | SR2000 | 250 | not used | 9 | aluminum plate (A3004P), | plate broken and hologram not transformed | — |

TABLE 1-continued

| | Pitch (μm) of Hologram | Groove Depth (μm) | Curvature (mm) of Upper Mold Support | Thickness (μm) of Nickel Plate | Thickness (μm) of Cushioning Member | Pressing Force (ton) | Material to which Hologram was to be Transferred | Transfer State | Transfer Depth (μm) |
|---|---|---|---|---|---|---|---|---|---|
| Example 5 | 5 | | | | | | thickness = 0.32 mm, Hv = 95, Ra = 0.1 μm | | |
| Comparative Example 6 | 0.4 to 5 | " | flat (SR00) | | 300 | 9 | aluminum plate (A3004P), thickness = 0.32 mm, Hv = 95, Ra = 0.1 μm | not transferred because of absorption of pressing force by cushioning member | — |

EXAMPLE 7

An aluminum plate (JIS A 3004P) having a thickness of 0.32 mm was punched into a disk having a diameter or 148 mm and subjected to draw-ironing forming, washing and trimming to obtain a cup having a height of 123 mm and an inner diameter of 66 mm. The outer surface of the obtained formed body had a center line average height of 0.05 μm, and the Vickers hardness was 95.

Then, a part of the outer surface of the cup-shaped body was pressed under a liner pressure of 80 kg/cm to the surface of a hologram-transferring tool to transfer a hologram to the formed body. Then, the outer surface of the cup-shaped formed body was coated and printed in the same manner as adopted in the conventional method except that the paint and ink were not transferred to the hologram-formed portion. Then, the entire of the outer surface of the cup-shaped body was coated with an epoxy type transparent resin in a thickness of 5 μm, and baking was carried out at 175° C. for 10 minutes to form a protecting layer.

A satisfactory image could be obtained from the hologram formed on the outer surface of the formed body.

EXAMPLE 8

A diffraction grating was formed by coining the same aluminum blank (thickness=0.22 mm) as used in Example 1 with a transfer tool having a diffraction grating formed thereon.

This aluminum blank was subjected to customary draw-ironing so that the diffraction grating was located at the central part of the bottom, whereby a two-piece can barrel prepared. The bottom had a domed shape having a radius of 55 mm. The pitch of the diffraction grating was set so that when an inner pressure of 4.0 kgf/cm$^2$ was applied, the pitch was 900 lines per mm.

A carbonated drink was filled in the obtained can barrel under an inner pressure of 4.0+5.0 kgf/cm$^2$ and a can lid was wrap-seamed to the can barrel to form a two-piece can. He-Ne laser beams were incident on the can at an angle of 34.7° by using the optical system described hereinbefore, and Moire fringes generated by the change of the pressure were photographed by a CCD camera. The number of Moire fringes within the observation visual field was measured and was compared with the spontaneous pressure of the can measured by a strain gauge pressure converter. It was confirmed that both were in agreement with each other at a precision of 0.1 kgf/cm$^2$. At this measurement, the treatments of from irradiation of He-Ne laser beams to measurement of the spontaneous pressure were completed within 5 milliseconds.

EXAMPLE 9

In the same manner as described in Example 1, an aluminum blank (thickness=0.23 mm) was coined with the transfer tool described in Example 1 to form a diffraction grating. By using this aluminum blank, a cap for a glass bottle having an opening diameter of 28 mm was prepared according to customary procedures so that the diffraction grating was located at the central part of the top face.

A fruit drink was filled in the glass bottle at a temperature of 80° C. with a head space of 20 ml. Immediately, the aluminum cap was wrap-seamed to thee glass bottle under a load of 200 kg to form a fruit drink-filled glass bottle vessel. In this vessel, a reduced pressure of 400+50 mmHg was brought about because of contraction of inner air. The pitch of the diffraction grating was set so that the pitch was 900 lines per mm under a reduced pressure of 400 mmHg. Moire fringes generated by the change of the inner pressure of the glass bottle vessel were photographed by a CCD camera by using the optical system described hereinbefore, and the pitch of Moire fringes was measured and compare with the pressure reduction degree of the vessel measured by a strain gauge type pressure converter. It was confirmed that the pressure reduction degree could be measured at a precision of 10 mmHg.

EXAMPLE 10

In the same manner as described in Example 1, a diffraction grating was formed by coining a tin-deposited steel plate having a thickness of 0.19 mm, a tin deposition amount of 2.8 g/cm$^2$ on one surface, a central line average height of 0.08 μm and a vickers hardness of 95 with the transfer tool described in Example 4. By using this tin-deposited steel plate, a can lid was prepared according to customary procedures so that the diffraction grating was located at the central part of the top face.

An aluminum can lid was wrap-seamed to a steel can barrel, and a coffee drink was filled at 75° C. so that the inner pressure was reduced to about 220+20 mmHg at room temperature by contraction of inner air. Immediately, the above-mentioned tin-deposited steel can lid was wrap-seamed to the filled can body. In the above-mentioned manner, 1,000 three-piece cans were prepared. The pitch of the diffraction grating was set so that the pitch was 900 lines per mm at a pressure reduction degree of 220 mmHg.

An apparatus for discharging a can having a bad inner pressure was assembled by using the optical system described hereinbefore, an image processing and judging apparatus and a conveyor as the discharge mechanism, and the above-mentioned three-piece cans were inspected under such condition that cans having a pressure reduction degree smaller than 150 mmHg were discharged as bad cans. Of 1,000 cans tested, fine cans were discharged as bad cans. When the inner pressure of the discharged bad cans were measured by using a strain gauge type pressure converter, it was found that the inner pressures were 0, 132, 89, 138 and 112 mmHg, respectively. The inner pressures of the cans judged as being good were similarly measured. The inner pressures were distributed in a range of from 764 mmHg to 248 mmHg.

What is claimed is:

1. A process for the preparation of a metal vessel with a hologram or a diffraction grating, which comprises
    preparing a metal plate mold having a concave-convex hologram or a diffraction grating formed on a gently curved face convex to the surface, wherein the ratio (P/D) of the diameter (D) of the curved surface to the protrusion height (P) is from $1.0 \times 10^{-5}$ to $5.0 \times 10^{-2}$ and
    stamping a metal blank or a metal container having a smooth surface with the metal plate mold at room temperature to transfer a relief type hologram or a relief type diffraction grating on the surface of the metal blank or the metal container by plastic deformation of the metal blank or the metal container.

2. A process according to claim 1, wherein the pitch of the concavities and convexities in the hologram or the grating is from 0.1 to 5 μm.

3. A process according to claim 1, wherein the metal blank or the metal container has a centerline average height according to JIS B 0601 smaller than 0.5 μm.

4. A process according to claim 1, wherein the metal blank or the metal container is composed of pure aluminum, an aluminum alloy or a tin plate.

5. A process according to claim 1, wherein the stamping is carried out under a pressure of 5 to 50 kgf/mm$^2$.

6. A process for the preparation of a metal vessel with a hologram or a diffraction grating, which comprises
preparing a deformable thin metal plate mold having a concave-convex hologram or a diffraction grating formed on the surface, supporting the thin metal plate mold on a pressing member through a cushioning layer having a compressive modulus of $1 \times 10^6$ to $1 \times 10^{10}$ Pa and a thickness of 10 to 200 μm,
stamping a metal blank or a metal container having a smooth surface by the thin metal plate mold through the cushioning layer at room temperature to transfer a relief type hologram or a relief type diffraction grating on the surface of the metal blank or the metal container by plastic deformation of the metal blank or the metal container.

7. A process according to claim 6, wherein said thin metal plate mold has a thickness of 25 to 200 μm.

8. A process according to claim 6, wherein the pitch of the concavities and convexities in the hologram or the grating is from 0.1 to 5 μm.

9. A process according to claim 6, wherein the metal blank or the metal container has a centerline average height according to JIS B 0601 smaller than 0.5 μm.

10. A process according to claim 6, wherein the metal blank or the metal container is composed of pure aluminum, an aluminum alloy or a tin plate.

11. A process according to claim 6, wherein the stamping is carried out under a pressure of 5 to 50 kgf/mm$^2$.

* * * * *